US006823522B1

United States Patent
Lamb

(10) Patent No.: US 6,823,522 B1
(45) Date of Patent: Nov. 23, 2004

(54) METHODS, SYSTEMS AND COMPUTER PROGRAM PRODUCTS FOR CHAINING INTEGRATION OBJECTS TO PROVIDE WEB ACCESS FOR LEGACY DATA SOURCES

(75) Inventor: Marshall A. Lamb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,210

(22) Filed: Jul. 15, 1999

(51) Int. Cl.[7] .............................. G06F 3/00; G06F 9/44; G06F 9/46; G06F 13/00
(52) U.S. Cl. ....................... 719/316; 719/310; 709/227; 709/228
(58) Field of Search ................................ 709/310, 316, 709/227, 228

(56) References Cited

U.S. PATENT DOCUMENTS

| 5,835,724 A | * | 11/1998 | Smith | 709/227 |
| 6,510,468 B1 | * | 1/2003 | Hayne | 709/246 |
| 6,532,463 B1 | * | 3/2003 | Robbins et al. | 707/9 |

OTHER PUBLICATIONS

Shah, Symphony: A Java-based Composition and Manipulation Framework for Distributed Legacy Resources, Mar. 30, 1998.*
Sun Microsystems, JavaServer Pages Specification Version 1.0, Java Software, Apr. 29, 1999.*
Shah et al., Symphony: a Java-based composition and manipulation framework for distributed legacy resources, May 17, 1999–May 18, 1999, pp. 2–12.*
Goel et al., WBSCSim: a prototype problem solving environment for wood-based composites simulations.*
NetObjects, New Visual JavaBean Assembly Product Enables Rapid Creation of Web Applications, Aug. 10, 1998.*
http://www.software.ibm.com/network/commserver/host-publisher; *About eNetwork Communications Server Host Publisher* and White Paper (1998).
http://www.software.ibm.com/network/commserver/library/publications/csnt.html; *eNetwork Communications Server for Windows NT Publications* (1998).

* cited by examiner

Primary Examiner—Thomas Lee
Assistant Examiner—Diem Cao
(74) Attorney, Agent, or Firm—Myers Bigel Sibley & Sajovec, P.A.; Gregory Doudnikoff

(57) ABSTRACT

Methods, systems and computer program products are provided which provide data to an end user from a host application or a database application by providing a plurality of integration objects which communicate with the host application or the database application and which provide information for communication with a browser application of the end user. At least two of the integration objects are chained such that instantiation of a first one of the integration objects provides an intermediate state as a start state for use by the second one of the integration objects. Furthermore, at least one of the two integration objects provides data for display by the browser application of the end user.

33 Claims, 7 Drawing Sheets

METHODS, SYSTEMS AND COMPUTER PROGRAM PRODUCTS FOR CHAINING INTEGRATION OBJECTS TO PROVIDE WEB ACCESS FOR LEGACY DATA SOURCES

FIELD OF THE INVENTION

The present invention relates to accessing legacy data sources such as IBM 3270 applications. In particular, the present invention relates to accessing legacy applications utilizing a web browser.

BACKGROUND OF THE INVENTION

Changes in the use of computers has resulted in a shift from a computing model with a large host central processing system which was accessed through terminals with little if any computing power towards a more distributed environment, such as the Internet or corporate intranets, where many transactions utilize the client/server computing model. However, many companies have extensive capital investments in applications and systems which utilized the host/terminal computing model utilized with the central processing "mainframe" and terminals. Furthermore, these applications were often developed for specific protocols, for example as 3270, 5250 or VT terminal applications. Many of these applications were text-based applications which do not take advantage of the graphics capabilities of modern workstations. Also, many of these applications may be too computational or data intensive to be readily ported to the client/server computing model without still requiring a mainframe as the server computer.

To allow the continued use of these "legacy" data sources, such as 3270 applications or database applications, The assignee of the present application International Business Machines Corporation has provided several mechanisms for accessing these legacy applications through a user's web browser. Such access allows continued use of the legacy data sources over, for example, the Internet or a company's intranet. In one example, a legacy data source is accessed by utilizing the web browser to execute a terminal emulation program which provides access to the legacy data source. Such terminal emulation solutions, however, typically only provided the original text based displays of the legacy data source in a window displayed on the end user's workstation.

While a terminal emulation system does provide access to legacy data sources, such a system may not take advantage of the graphic capabilities which many user's workstations are capable of and which users of web based applications have come to expect.

Furthermore, the terminal emulation solutions typically required users to understand and operate the legacy applications in their original form and did not take advantage of the more user friendly graphical interfaces which may be provided through the graphics capabilities of a typical workstation. To better utilize all of the capabilities which web access to legacy data sources made possible, International Business Machines Corporation introduced Host Publisher Version 1 as part of its eNetwork Communications Server for Windows NT. Host Publisher Version 1 provided a graphic interface to legacy data sources for users of Windows NT compatible systems through the user's web browser.

Host Publisher Version 1 provided browser access to legacy data sources through the use of integration objects which were object oriented programming objects which included a method which accessed the legacy data source to execute an application and provided the results of the application to the end user as a Hyper-Text Markup Language (HTML) page which was interpretable by the user's web browser. A user would request an application and Host Publisher Version 1 would instantiate the integration object corresponding to the requested application. The integration object assumed that the legacy data source was in an initial state and returned the legacy data source to that initial state upon completion of its method. Thus, for example, an integration object would assume that a 3270 session was in the "ready" state when it was invoked and would return the 3270 session to the "ready" state upon completion. Each application had a single integration object associated with it. Integration objects in Host Publisher Version 1 were standalone applications in that each integration object did not require interaction with any other integration object to execute its associated application.

While Host Publisher Version 1 provided improvements over text based terminal emulation in providing browser oriented access to legacy data sources, the integration objects of Host Publisher Version 1 could be difficult to program to provide complex applications as only one integration object was associated with an application. Thus, a developer would need to know details of accessing the legacy data source in order to incorporate this access into the integration object. Furthermore, because each application was a single integration object, all of the complexity of the application would need to be incorporated into the single integration object. Furthermore, Host Publisher Version 1 was limited to the Windows NT environment.

In light of the above discussion, improvements are needed in browser access to legacy data sources.

SUMMARY OF THE INVENTION

Accordingly, it is an object of the present invention to provide methods, systems and computer program products for improved browser access to legacy data sources.

It is a further object of the present invention to reduce the difficulty of programming more complex applications for access to legacy data sources.

Still another object of the present invention is to provide increased flexibility in programming browser oriented applications which access legacy data sources.

These and other objects may be provided, according to the present invention, by methods, systems and computer program products which provide data to an end user from a host application or a database application by providing a plurality of integration objects which communicate with the host application or the database application and which provide information for communication with a browser application of the end user. At least two of the integration objects are chained such that instantiation of a first one of the integration objects provides an intermediate state as a start state for use by the second one of the integration objects. Furthermore, at least one of the two integration objects provides data for display by the browser application of the end user.

By chaining integration objects together to build an application, the present invention may allow a developer to build complex applications from simpler building blocks. Furthermore, by allowing the final state of an integration object to be an intermediate state, rather than the start state of the integration object, the complexity of the integration objects may also be reduced. For example, the integration objects no longer need to start and end in the session "ready"

state but may stop in any session state which would then be used as the start state of the next integration object. Also, chaining integration objects allows for a development environment where the developer need not know the details of the underlying legacy data source access but may merely chain predefined integration objects to provide the desired result. Furthermore, the developer need not know the details of how the chaining is accomplished but may be provided with a graphical interface where the chaining relationships are defined.

In a further embodiment of the present invention, a plurality of browser interpretable pages are provided which are accessible to the browser application. The integration objects are embedded into at least one of the plurality of browser interpretable pages. Furthermore, the first of the two integration objects may provide a start state for the second of the two integration objects by providing an output of the first of the two integration objects as an input to the second of the two integration objects.

The integration objects may be embedded into a single browser interpretable page, in which case the integration objects may be chained by sequentially invoking methods associated with the integration objects. Furthermore, the integration objects may be embedded into separate browser interpretable pages in which case the integration objects are chained by sequentially invoking at least one method associated with a corresponding one of the at least two integration objects when the corresponding browser interpretable pages are accessed. The browser interpretable pages may be consecutively or nonconsecutively accessed. If the pages are nonconsecutively accessed, the first of the two integration objects provides a start state for the second of the two integration objects by storing an output of the first of the two integration objects as a session variable accessible to subsequent browser interpretable pages so as to provide an input to the second of the two integration objects embedded in the non-consecutive browser interpretable page.

In a still further embodiment of the present invention a method of the first of the two integration objects may obtain user input from the user which is provided as input to the second of the two integration objects. Furthermore, the integration objects may render data obtained from the either the host application or the database for display by the browser application.

Preferably, the integration objects are Java Beans embedded in a Java Server Page (JSP) page. Furthermore, the results data may be rendered and incorporated into an HTML page which includes a JSP tag corresponding to the bean of the integration object. The HTML page with the incorporated results data may then be provided to the browser application.

Through the utilization of the Java and JSP pages, the present invention provides for platform independent applications. Furthermore, the applications may be created by creating HTML/JSP pages which incorporate the integration objects which allows a developer to develop an application without detailed knowledge of the underlying access methods of the host or database applications. Thus, the present invention may provide more flexibility in developed applications, a simpler approach to generating complex applications by chaining integration objects as building blocks for the application and platform independence through the use of Java and JSP pages.

While the invention has been described above primarily with respect to the method aspects of the invention, both systems and computer program products are also provided.

DETAILED DESCRIPTION OF PREFERRED EMBODIMENTS

Figure 1:
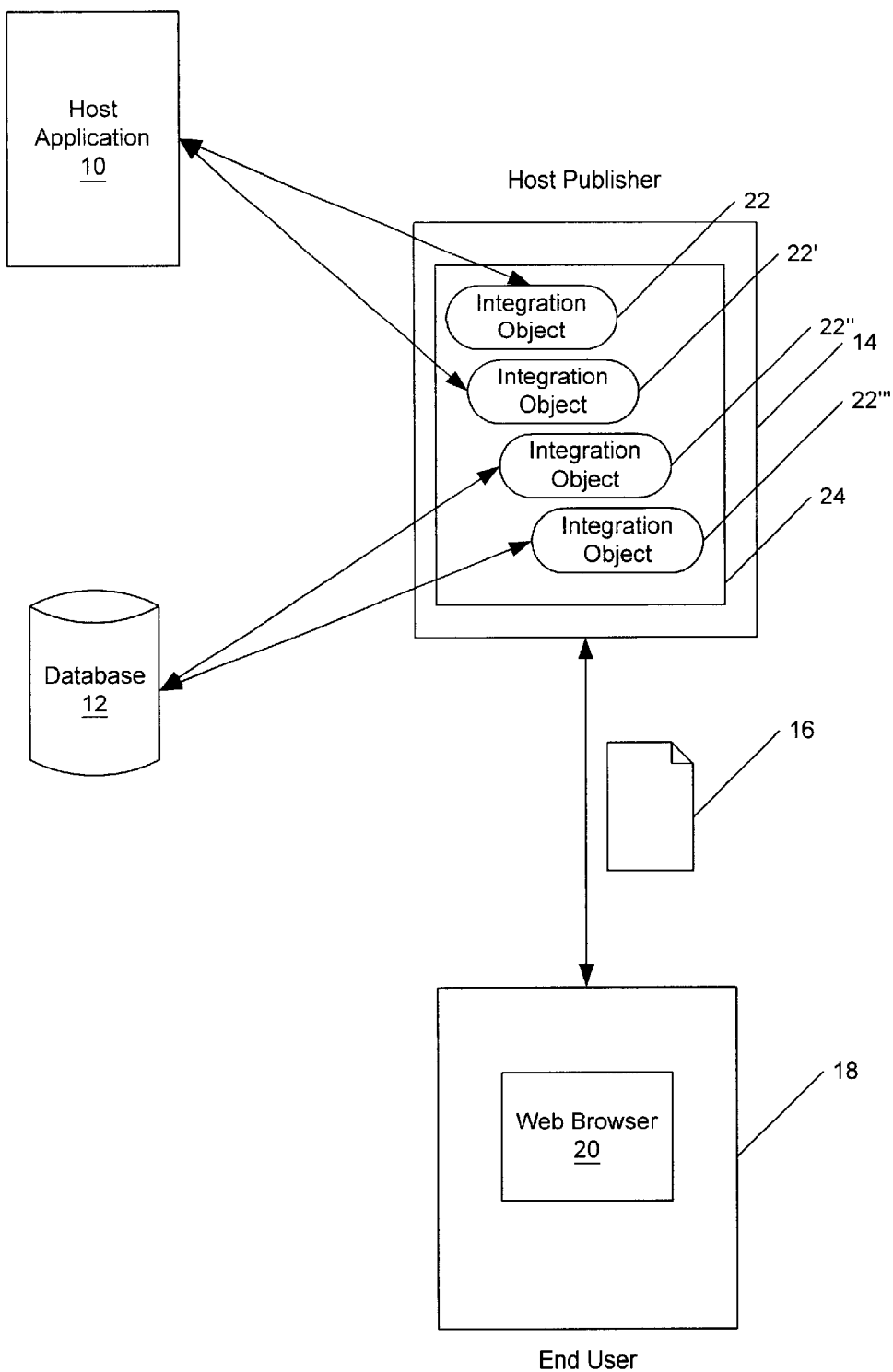
FIG. 1 is a block diagram of a system according to the present invention.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to diagrams and flowchart illustrations of methods, apparatus (systems) and computer program products according to an embodiment of the invention. It will be understood that each block of the diagrams and flowchart illustrations, and combinations of blocks in the diagrams and flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the diagram or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram or flowchart block or blocks.

As is seen in FIG. 1, the present invention allows access to legacy data sources, such as host application 10 or database application 12, from a web browser 20 executing on a user's workstation 18 by providing to the browser 20 browser interpretable pages 16 such as HTML pages or Extensible Markup Language (XML) pages. As will be appreciated by those of skill in the art, the user's workstation 18 may be any device capable of rendering the browser interpretable pages 16 such as, for example, a personal computer or a network computer or even pervasive computing devices such as a personal data assistant (PDA) or a smartphone. Furthermore, the term browser is used herein to refer to any application, program, hardware or other device which may interpret and display a browser interpretable page such as an HTML or XML page. Accordingly, the present invention should not be construed as limited to any particular workstation or browser implementation.

As is further illustrated in FIG. 1, access to the legacy data sources 10 and 12 is provided by a host publisher 14 which provides a composite application 24 which includes chained integration objects 22, 22', 22" and 22'". As used herein the term composite application refers to an application which utilizes chained integration objects as described herein. Integration objects according to the present invention are preferably object oriented objects which may include inputs, outputs and include at least one method for accessing a legacy data source. The integration objects may also provide data associated with a legacy data source for rendering in a browser interpretable page to be provided to a browser of an end user. The present invention provides for chaining of integration objects such that one integration object may terminate in an "intermediate state" and, thereby, provide a "start state" for a subsequent integration object within the same application.

As used herein, the term "start state" refers to an initial state required by an integration object for execution of a method of the integration object. The start state may be a session state or may be input which may be used by a subsequent integration object. Furthermore, the term "intermediate state" is used herein to describe a state which exists after the invocation of the method associated with an integration object and is not the start state of the integration object. The intermediate state may be a session state or results of invocation of the method. As is clear from the above discussion, the intermediate state and the start state of integration objects according to the present invention may be any state in a session and will generally not be the same state for all integration objects. Thus, for example, certain integration objects may be precluded from being consecutively chained because the intermediate state of the first integration object provides a session state which is incompatible with the session state required as the start state by the second integration object.

Figure 2:
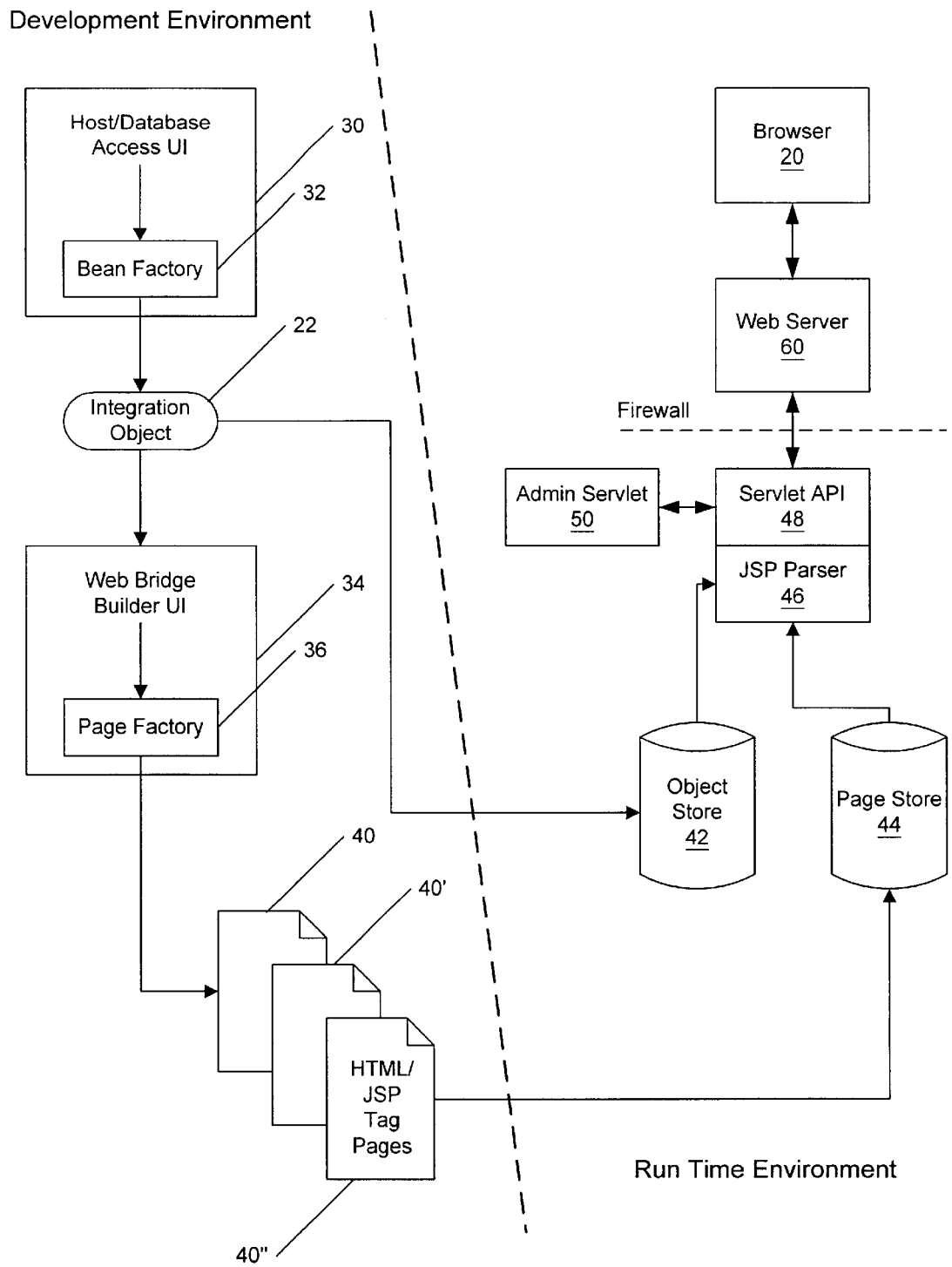
FIG. 2 is a block diagram illustrating the design time and run time aspects of a particular embodiment of the present invention.

FIG. 2 illustrates a particular embodiment of the present invention and the run time environment and development time environment which may be provided by the present invention. As seen in FIG. 2, the development time environment is illustrated to the left of the diagonal dashed line and the run time environment to the right of the dashed line. Furthermore, as is seen in FIG. 2, it is preferred that the present invention be implemented in a Java® environment utilizing Java Server Page (JSP) pages and HTML or XML pages. Thus, the integration objects 22, 22', 22" and 22'" of FIG. 1 are preferably embedded in one or more HTML/JSP pages, which are HTML pages with JSP tags incorporated in the pages, to provide the composite application 24. Also, the integration objects are preferably Java beans so as to facilitate the use of JSP.

As will be appreciated by those of skill in the art, JSP pages are text-based documents that describe how to process a request to create a response. A JSP page is executed by a JSP engine which is installed on a web server or on a web enabled application server. The JSP engine delivers requests from a client to a JSP page and responses from the JSP page to the client. A JSP page typically contains declarations, fixed template data, action instances and scripting elements. When a request is delivered to a JSP page, all these pieces may be used to create a response object whose output is then returned to the client.

Returning to FIG. 2, in developing an application for accessing a legacy data source, the host/database access user interface 30 is utilized in conjunction with bean factory 32 to provide integration objects 22. A Host Access User Interface (UI) portion of the host/database access user interface 30 records a developers interaction with a host application, for example, a 3270, 5250 or VT terminal application, and creates an integration object Java Bean which encapsulates these interactions. A Database Access UI portion of the host/database access user interface 30 creates an integration object Java Bean for data contained in a database by, for example, asking the developer a series of questions which identify databases, tables, etc., that are to be published.

For example, with respect to the Host Access UI, the Java beans which make up the integration objects 22 may be created by utilizing International Business Machines Corporations's SecureWay Host On-Demand macro and terminal beans to record and store interaction and data capture in the form of an XML macro file. Configuration information such as details about property names, parameter types, return types and a package name for the bean may also be stored in an XML file. Session details may also be provided in a master XML file which contains connection details such as the host name, port, etc., lists valid user identifications and passwords and specifies logon, logout and recovery macros for each session specification. The bean factory 32 takes these XML files for the bean and generates a new bean based on a reference template. The bean is then compiled into its class form. This process may be repeated to provide a plurality of beans which perform different legacy data source access tasks or functions.

The developer utilizes the web bridge builder user interface 34 to combine integration object beans into a web application. Preferably, the web bridge builder user interface 34 is a graphical user interface which provides wizards which may guide a developer through the application generation process and which preferably include validation rules which assist the developer in avoiding improper or illegal chaining of integration objects in developing the composite application. In general, the developer would create a new application project and import existing integration objects into the project. The user interface may be a graphical display which displays the imported integration objects. The developer then builds HTML and JSP pages by specifying what integration objects (beans) are to be used on each page, how the integration objects are to be chained and how their data are to be rendered. The HTML/JSP pages, such as pages 40, 40' and 40", are then generated by the page factory 36 based on the results of the user definition process. Preferably the developer is guided through the build process with the assistance of a wizard which provides available options for each step of the build process based upon previous selections by the developer. The developer may then publish the created application to a web server by placing in an application specific directory on the web server the integration objects and HTML/JSP pages, all required XML macro files, all session information from the master XML file required to support the chosen integration objects and an application manifest which provides a record of the pieces being published and which associates the pieces with the application name.

The web server preferably includes host publisher functions and underlying base run-time support such as is provided by International Business Machines Corporation's WebSphere application server. Thus, in FIG. 2, the web server preferably provides an object store 42 which includes integration objects utilized in applications published to the server, a page store 44 which includes HTML/JSP pages for applications published to the server, a JSP parser 46, a servlet Application Program Interface (API) 48, and an administration servlet 50 which provides for startup, configuration and maintenance of the host publisher features of the server. These functions of the server may be made inaccessible to users of the system through the public web server access functions 60, which allow a browser 20 of a user to interface with the web server, which is separated from the other web server functions by a firewall as illustrated in FIG. 2.

After initialization of the base server and the host publisher functions of the web server through utilization of the administration servlet 50, the run time environment of the present invention accepts requests for applications from a browser 20 of a user. Such a request is received by the browser 20 requesting the first page of the application from web server 60. The page is retrieved from the page store 44 and, if the page includes JSP tags, the JSP parser 46, for example, of WebSphere, parses the page and creates a servlet based on the embedded JSP tags which specify the beans of the integration objects embedded in the page. The servlet is then invoked and instantiates the referenced integration object beans and invokes the beans action method. The integration object requests a session and runs its session macro against the session provided. When the macro finishes, the bean returns its results to the servlet which renders the results as HTML within the original page. When each of the integration objects in the page have completed, the page is then returned to the requesting browser 20.

As described above, the integration objects request and obtain sessions for execution of their session macros. Any method in which sessions are provided to the integration objects may be utilized with the present invention. For example, the session management methods of Host Publisher Version 1, SecureWay Host On-Demand or other such legacy data source access systems may be utilized. Thus, methods for managing such distribution of sessions are known to those of skill in the art and, therefore, need not be described further herein.

As was briefly described above, the present invention provides for the chaining of integration objects so as to allow developers to create complex applications from less complex building blocks. The chaining of integration objects according to the present invention may provide for three different relationships between two integration objects. These relationships are illustrated in FIGS. 3 through 5.

Figure 3:
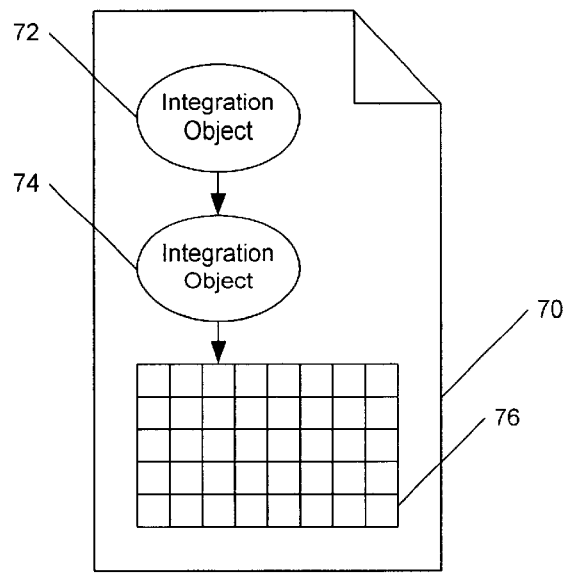
FIG. 3 is a diagram illustrating chaining of integration objects within a single HTML page.

FIG. 3 illustrates chaining of two integration objects within a single HTML/JSP page 70. As seen in FIG. 3, the first integration object 72 is chained to the second integration object 74 such that the first integration object 72 terminates in an intermediate state which provides the start state for the second integration object 74. Thus, FIG. 3 illustrates two integration objects which are consecutively chained on a single HTML/JSP page. The action methods of integration objects 72 and 74 would be sequentially invoked by the servlet created by the JSP parser 46 when the page 70 was requested by browser 20. The results of integration objects 72 and 74 would then be integrated into page 70, by for example, rendering the data table 76 illustrated in FIG. 3, and the page containing the rendered results provided to browser 20.

Figure 4:
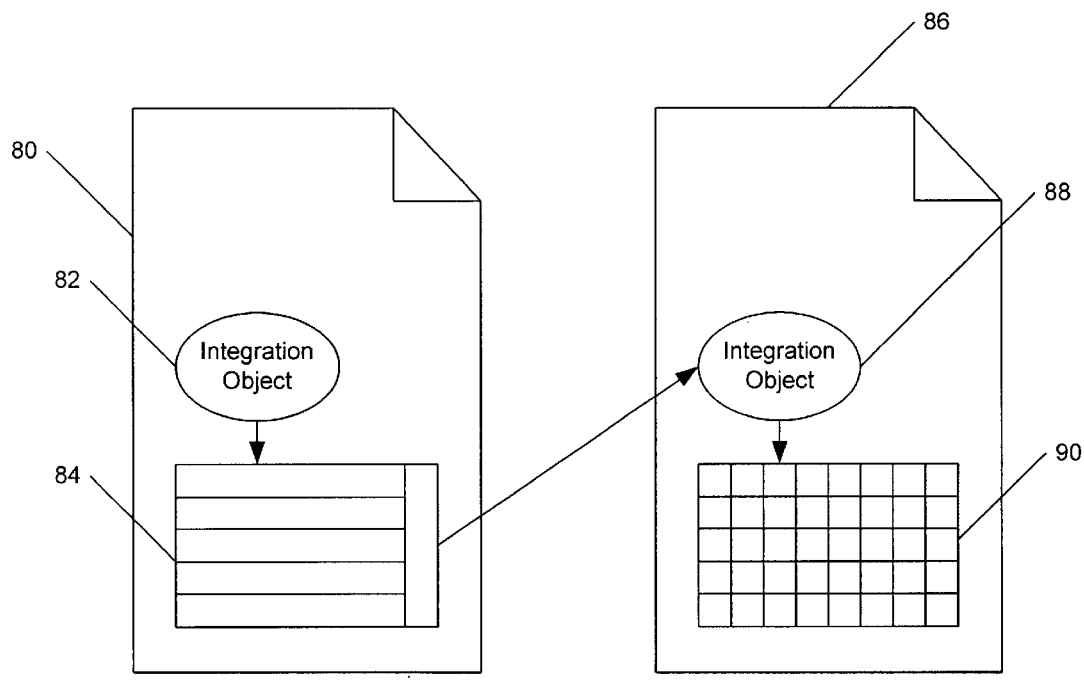
FIG. 4 is a diagram illustrating chaining of integration objects across multiple HTML pages.

FIG. 4 illustrates chaining of two integration objects embedded in two consecutive HTML/JSP pages 80 and 86. As seen in FIG. 4, the first integration object 82 is embedded in HTML/JSP page 80. The JSP parser 46 would create a servlet which invokes its method and rendering its results which are integrated into page 80. As is seen in FIG. 4, the results of integration object 82 may be a users selection box 84. This page is then provided to the user. When the user makes a selection, page 86 is requested and JSP parser 46 generates a servlet which invokes the second integration object 88 which was embedded in page 86. The second integration object 88 utilizes as input the user selection and the servlet invokes the method of integration object 88 and renders its results, such as the data table 90, which are integrated into page 86 and provided to browser 20. Thus, FIG. 4 illustrates two integration objects which are chained on consecutive HTML/JSP pages.

Figure 5:
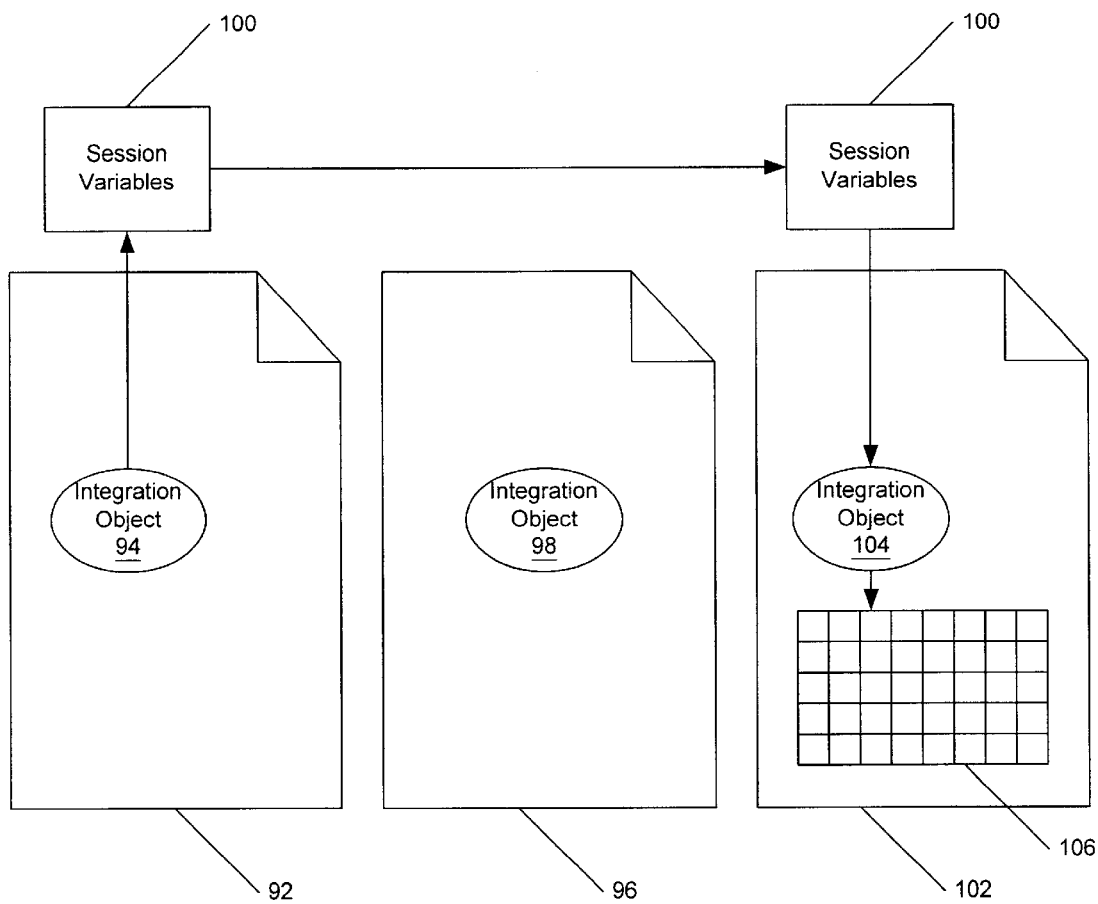
FIG. 5 is a diagram illustrating chaining of integration objects across multiple non-sequential HTML pages.

FIG. 5 illustrates chaining of two integration objects embedded in two non-consecutive HTML/JSP pages 92 and 102. As seen in FIG. 5, the first integration object 94 is embedded in HTML/JSP page 92. The JSP parser 46 would create a servlet which invokes its method and renders its results which are integrated into page 92 and provided to browser 20. However, because the integration object 94 is chained with integration object 104, the intermediate state of integration object 94 which provides the start state for integration object 104 is stored in the session variables 100 which provide persistent data between pages such that subsequent pages may access data from previous pages. The user then requests page 96 which includes integration object 98. Again, the JSP parser 46 would create a servlet which invokes the action method of integration object 98 and render its results which are integrated into page 96 which would be provided to browser 20. When the browse 20 requests page 102 the JSP parser 46 generates a servlet which invokes the second chained integration object 104 which is embedded in page 102. The second integration object 102 accesses the session variables 100 and utilizes as input the intermediate state from integration object 94 stored in the session variables 100 and the servlet invokes the method of integration object 104 and renders its results, such as the data table 106, which are integrated into page 102 and provided to browser 20. Thus, FIG. 5 illustrates two integration objects which are chained on non-consecutive HTML/JSP pages.

While the chaining illustrated in FIGS. 3, 4 and has been described with respect to particular intermediate states which are provided as start states for the second integration object, the intermediate and start states may take many different forms. For example, while the first integration object 82 of FIG. 4 provided user input as the intermediate state which provided the input as the start state to the second integration object 88, other intermediate states may have been utilized. For example, the first integration object 82 of FIG. 4 could have left a host session in a predetermined state as the intermediate state which provided an assumed host session state as the start state for the second integration object 88. Alternatively, the first integration object 82 of FIG. 4 could have provided data from a database without user intervention as the intermediate state which provided input data as the start state for the second integration object 88. Thus, the chaining of the present invention is not limited to particular sequences or particular interactions between integration objects but provides for utilizing a first integration object to establish conditions which allow a second integration object to carry out its action method.

Figure 6:
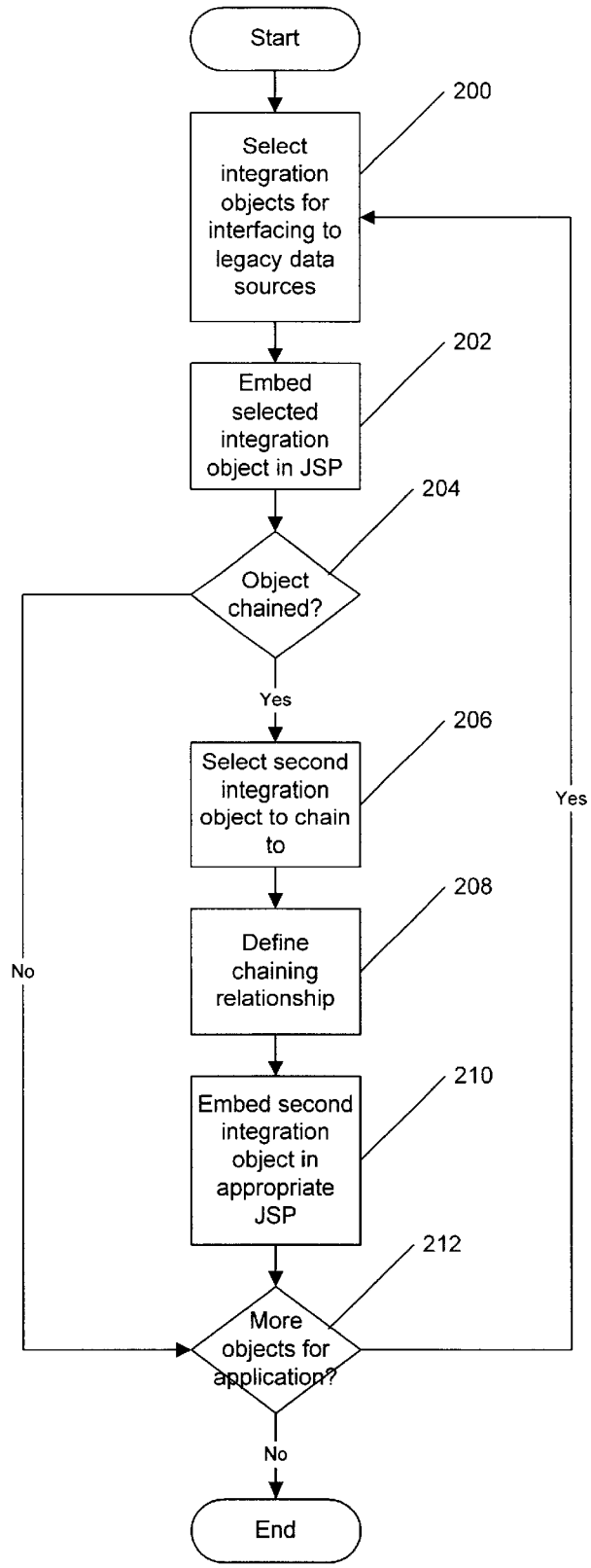
FIG. 6 is a flowchart illustrating development time operations according to one embodiment of the present invention.

FIG. 6 illustrates further details on the development time aspects of the present invention. As seen in FIG. 6, when a developer is creating an application, the developer selects an integration object for interfacing with the legacy data source (block 200). This selection may be made by selecting from a list of available integration objects. The selected integration object is then embedded in an HTML/JSP page (block 202), wither a new or previously defined page. This embedding process may occur by incorporating JSP tags which reference the integration object in the HTML page. The developer then specifies if the object is chained (block 204), by, for example, being prompted by a wizard to respond to a query. If the object is chained, then the developer selects a second integration object to which the integration object is chained (block 206). This may be accomplished by a wizard presenting to the developer a list of suitable integration objects which have a start state corresponding to the intermediate state of the first integration object. The developer then defines the chaining relationship (block 208) (i.e. one of the three relationships of FIGS. 3 through 5) and the second integration object embedded in the appropriate. HTML/JSP page based on the specified relationship (block 210). If there are more integration objects in the application (block 212) this process is repeated until all the integration objects have been incorporated into their respective pages.

Figure 8:
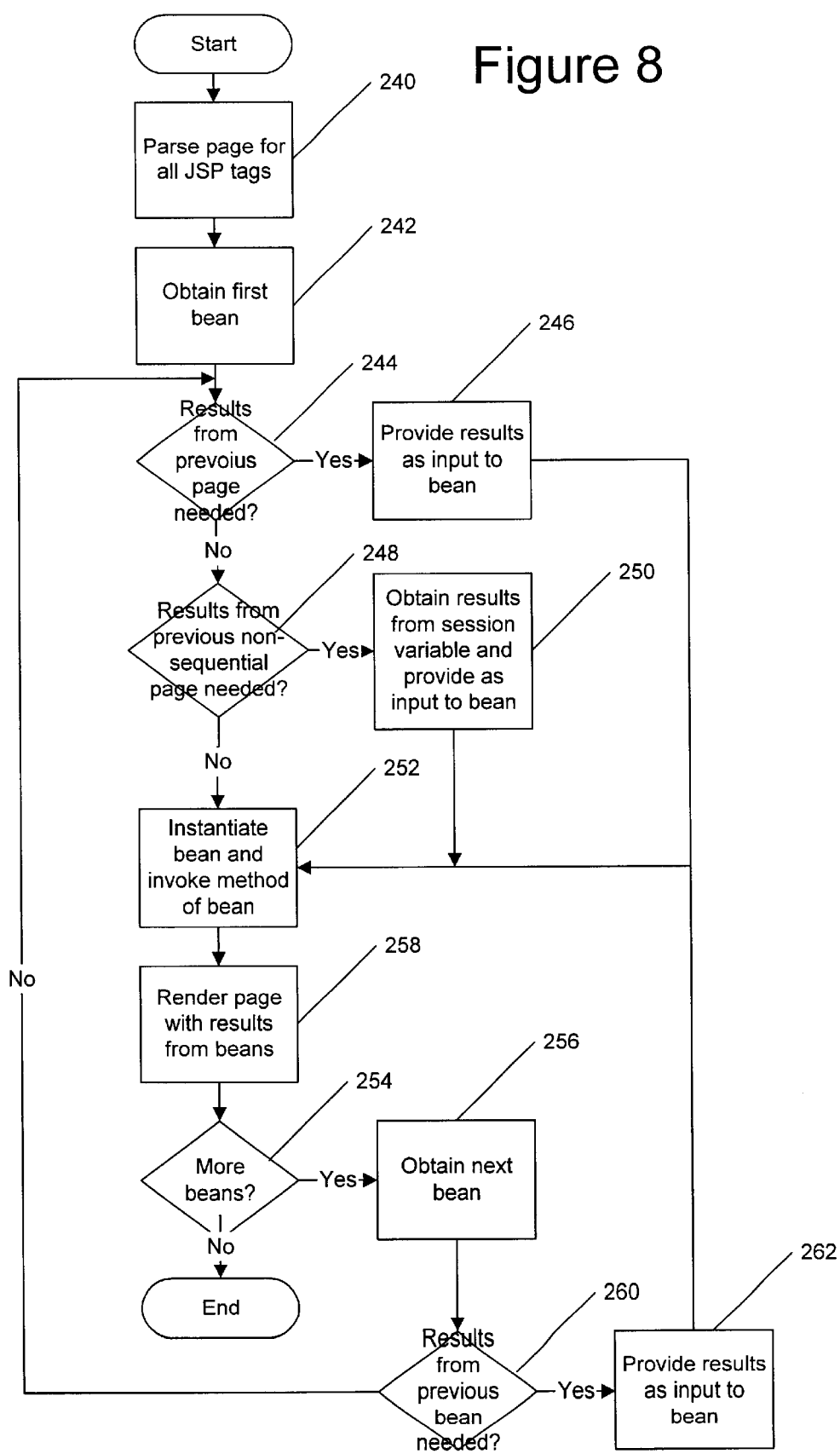
FIG. 8 is a flowchart illustrating operations of a servlet generated from a Java Server Page (JSP) according to the present invention.

FIG. 8 illustrates further details of the operations of the web server when a request for a page is received from browser 20. As is seen in FIG. 8, the web server obtains the requested page from the page store 44 (block 220). The page is parsed by the JSP parser 46 for JSP tags (block 222) and if no JSP tags are found the HTML page is provided to the browser 20 (block 228). However, if JSP tags are present, the specified integration objects are obtained from the object store 42 and the JSP engine of WebShpere generates a servlet to execute the methods of the embedded beans of the integration objects (block 224). The results of executing the methods of the beans are the rendered and incorporated into the HTML page (block 226). The integrated page is then provided to the web browser 20 (block 228). If more pages are present in the application (block 230), then the next page requested by the browser is obtained (block 220) and the processing of that page begins.

Figure 7:
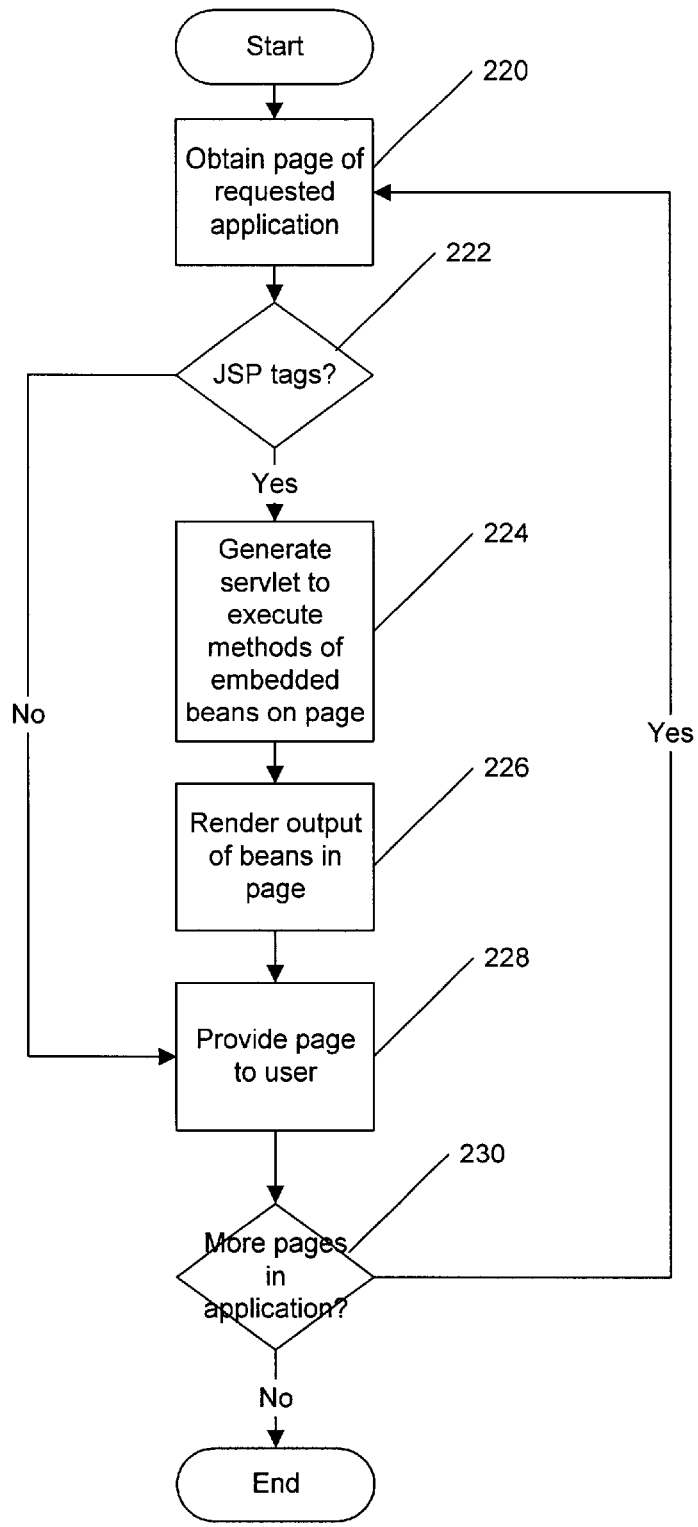
FIG. 7 is a flowchart illustrating run time operations according to one embodiment of the present invention.

FIG. 7 illustrates further details of the operations of the JSP parser 46 and the servlets generated by the JSP parser 46 as reflected in blocks 222 through 228 of FIG. 6. As illustrated in FIG. 7, the page is parsed for all JSP tags (block 240) and the bean of the first integration object obtained (block 242). It is then determined if this bean is chained to a previous consecutive page (block 244) and if so the results from the previous page are provided as input to the bean (block 246). If the bean is not chained from a previous consecutive page, then it is determined if the bean is chained to a bean from a previous non-consecutive page (block 248). If so, then the results are obtained from the session variables and provided to the bean as input (block 250).

In any event, the bean is instantiated and the action method of the bean invoked (block 252). The results of the bean are then rendered and incorporated into the page (block 258). It is then determined if there are more beans in the page (block 254) and if so, the next bean is obtained (block 256). If this new bean is chained to a previous bean on the page (block 260), then the results of the previous bean are provided as input to the new bean (block 262) and the process continues from block 252. However, if the new bean is not chained to a previous bean on the page then the tests for the other chaining methods are performed as reflected in blocks 244 through 250). In any case, the new bean is then instantiated and its action method invoked and the process continues until all the beans on the page have been processed (block 254).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of providing data to an end user from a host application having multiple session states, the method comprising the steps of:

providing a plurality of integration objects which communicate with the host application and which provide information for communication with a browser application of the end user; and chaining at least two integration objects where instantiation of a first one of the at least two integration objects begins in an initial session state and ends in a final session state that is different from the initial session state so as to provide an intermediate session state as a start session state for use by a second one of the at least two integration objects and wherein at least one of the at least two integration objects provides data for display by the browser application of the end user.

2. A method according to claim 1, further comprising the steps of:

providing a plurality of browser interpretable pages which are accessible to the browser application; and embedding the at least two integration objects into at least one of the plurality of browser interpretable pages.

3. A method according to claim 2, wherein the at least two integration objects are embedded into a single browser interpretable page and wherein the step of chaining comprises the step of sequentially invoking methods associated with the at least two integration objects.

4. A method according to claim 2, wherein the at least two integration objects are embedded into separate browser interpretable pages and wherein the step of chaining comprises the step of sequentially invoking at least one method associated with a corresponding one of the at least two integration objects when the corresponding browser interpretable pages are accessed.

5. A method according to claim 4, wherein the browser interpretable pages are consecutively accessed.

6. A method according to claim 4, wherein the browser interpretable pages are non-consecutively accessed.

7. A method according to claim 2, wherein at least one of the at least two integration objects renders data obtained from the at least one of the host application and the database for display by the browser application.

8. A method according to claim 1, wherein the integration objects comprise Java Beans.

9. A method according to claim 8, further comprising the steps of:
providing a plurality of browser interpretable pages which are accessible to the browser application; and
embedding the Java Beans of the at least two integration objects into at least one of the plurality of browser interpretable pages.

10. A method according to claim 9, wherein the browser interpretable pages are at least one of Hyper-Text Markup Language (HTML) and Extensible Markup Language (XML) pages.

11. A method according to claim 9, wherein the step of embedding the Java Beans comprises the step of incorporating Java Server Page (JSP) tags into the browser interpretable page wherein the JSP tags identify the Java Bean of the at least one integration object.

12. A system for providing data to an end user from a host application having multiple session states, comprising:
means for providing a plurality of integration objects which communicate with the host application and which provide information for communication with a browser application of the end user; and
means for chaining at least two integration objects where instantiation of a first one of the at least two integration objects begins in an initial session state and ends in a final session state that is different from the initial session state so as to provide an intermediate session state as a start session state for use by a second one of the at least two integration objects and wherein at least one of the at least two integration objects provides data for display by the browser application of the end user.

13. A system according to claim 12, further comprising:
means for providing a plurality of browser interpretable pages which are accessible to the browser application; and
means for embedding the at least two integration objects into at least one of the plurality of browser interpretable pages.

14. A system according to claim 13, wherein the at least two integration objects are embedded into a single browser interpretable page and wherein the means for chaining comprises means for sequentially invoking methods associated with the at least two integration objects.

15. A system according to claim 13, wherein the at least two integration objects are embedded into separate browser interpretable pages and wherein the means for chaining comprises means for sequentially invoking at least one method associated with a corresponding one of the at least two integration objects when the corresponding browser interpretable pages are accessed.

16. A system according to claim 15, wherein the browser interpretable pages are consecutively accessed.

17. A system according to claim 15, wherein the browser interpretable pages are non-consecutively accessed.

18. A system according to claim 13, wherein at least one of the at least two integration objects renders data obtained from the at least one of the host application and the database for display by the browser application.

19. A system according to claim 12, wherein the integration objects comprise Java Beans.

20. A system according to claim 19, further comprising:
means for providing a plurality of browser interpretable pages which are accessible to the browser application; and
means for embedding the Java Beans of the at least two integration objects into at least one of the plurality of browser interpretable pages.

21. A system according to claim 20, wherein the browser interpretable pages are at least one of Hyper-Text Markup Language (HTML) and Extensible Markup Language (XML) pages.

22. A system according to claim 20, wherein the means for embedding the Java Beans comprises means for incorporating Java Server Page (JSP) tags into the browser interpretable page wherein the JSP tags identify the Java Bean of the at least one integration object.

23. A computer program product for providing data to an end user from a host application having multiple session states, comprising:
a computer readable storage medium having computer-readable program code means embodied in the medium, the computer-readable code computer-readable code means comprising:
computer-readable code means for providing a plurality of integration objects which communicate with the host application and which provide information for communication with a browser application of the end user; and
computer-readable code means for chaining at least two integration objects where instantiation of a first one of the at least two integration objects begins in an initial session state and ends in a final session state that is different from the initial session state so as to provide an intermediate session state as a start session state for use by a second one of the at least two integration objects and wherein at least one of the at least two integration objects provides data for display by the browser application of the end user.

24. A computer program product according to claim 23, further comprising:
computer-readable code means for providing a plurality of browser interpretable pages which are accessible to the browser application; and
computer-readable code means for embedding the at least two integration objects into at least one of the plurality of browser interpretable pages.

25. A computer program product according to claim 24, wherein the at least two integration objects are embedded into a single browser interpretable page and wherein the computer-readable code means for chaining comprises computer-readable code means for sequentially invoking methods associated with the at least two integration objects.

26. A computer program product according to claim 24, wherein the at least two integration objects are embedded into separate browser interpretable pages and wherein the computer-readable code means for chaining comprises computer-readable code means for sequentially invoking at least one method associated with a corresponding one of the at least two integration objects when the corresponding browser interpretable pages are accessed.

27. A computer program product according to claim 26, wherein the browser interpretable pages are consecutively accessed.

28. A computer program product according to claim 26, wherein the browser interpretable pages are non-consecutively accessed.

29. A computer program product according to claim 24, wherein at least one of the at least two integration objects renders data obtained from the at least one of the host application and the database for display by the browser application.

30. A computer program product according to claim 23, wherein the integration objects comprise Java Beans.

31. A computer program product according to claim 30, further comprising:

computer-readable code means for providing a plurality of browser interpretable pages which are accessible to the browser application; and computer-readable code means for embedding the Java Beans of the at least two integration objects into at least one of the plurality of browser interpretable pages.

32. A computer program product according to claim 31, wherein the browser interpretable pages are at least one of Hyper-Text Markup Language (HTML) and Extensible Markup Language (XML) pages.

33. A computer program product according to claim 31, wherein the computer-readable code means for embedding the Java Beans comprises computer-readable code means for incorporating Java Server Page (JSP) tags into the browser interpretable page wherein the JSP tags identify the Java Bean of the at least one integration object.

* * * * *